(12) United States Patent
Cobzaru et al.

(10) Patent No.: US 6,705,149 B2
(45) Date of Patent: Mar. 16, 2004

(54) UNIVERSAL BACKUP MANDREL WITH RETRACTABLE SLEEVE AND SHOCK ABSORBING MEANS

(75) Inventors: Cristinel O. Cobzaru, Murrieta, CA (US); Alan Myers, Quail Valley, CA (US)

(73) Assignee: Huck Patents, Inc., Wilmington, DE (US)

(*) Notice: Subject to any disclaimer, the term of this patent is extended or adjusted under 35 U.S.C. 154(b) by 0 days.

(21) Appl. No.: 10/154,227

(22) Filed: May 23, 2002

(65) Prior Publication Data

US 2002/0194719 A1 Dec. 26, 2002

Related U.S. Application Data

(60) Provisional application No. 60/293,416, filed on May 25, 2001.

(51) Int. Cl.[7] .............................................. B21D 37/00
(52) U.S. Cl. ................ 72/391.4; 72/391.8; 29/243.518; 29/243.53
(58) Field of Search ............................. 72/391.4, 391.6, 72/391.8; 29/243.517, 243.518, 243.53, 543.519

(56) References Cited

U.S. PATENT DOCUMENTS

| | | | | |
|---|---|---|---|---|
| 2,049,822 A | * | 8/1936 | Polly | 72/114 |
| 2,455,903 A | * | 12/1948 | Fischer | 29/243.518 |
| 2,717,714 A | * | 9/1955 | Haley | 29/243.518 |
| 4,747,738 A | | 5/1988 | Duran | |
| 4,765,177 A | * | 8/1988 | Pendleton et al. | 72/391.4 |
| 5,073,070 A | | 12/1991 | Chang | |
| 5,399,053 A | | 3/1995 | Duran | |
| 5,526,669 A | * | 6/1996 | Gjovik et al. | 72/391.2 |

* cited by examiner

*Primary Examiner*—David B. Jones
(74) *Attorney, Agent, or Firm*—Christie, Parker & Hale, LLP

(57) ABSTRACT

A backup mandrel for attaching a grommet to a washer in an aircraft panel opening having a housing and a nose piece attached to the housing, the nose piece having an opening. A stem is attached to the housing and has a first and a second portion, such that the first portion is disposed within the housing and the second portion protrudes from housing through the nose piece opening. A sleeve is also attached to the housing and has a first and a second segment, such that the first segment is disposed within the housing and the second segment protrudes from the housing through the nose piece opening, wherein the sleeve is displaceably mounted around the stem.

24 Claims, 12 Drawing Sheets

UNIVERSAL BACKUP MANDREL WITH RETRACTABLE SLEEVE AND SHOCK ABSORBING MEANS

CROSS-REFERENCE TO RELATED APPLICATION(S)

This application claims priority to U.S. Provisional Application Ser. No. 60/293,416, filed on May 25, 2001.

FIELD OF THE INVENTION

The present invention is directed to a backup mandrel. More particularly, the present invention is directed to a backup mandrel for attaching a grommet to a washer within an opening in an aircraft panel.

BACKGROUND OF THE INVENTION

An aircraft typically has an outer skin comprised of a plurality of panels. Each panel, in turn, typically comprises a plurality of openings for receiving screws, bolts, rivets or the like (hereinafter fasteners), which are used to fasten the panel to an internal structure of the aircraft. When the panel has been fastened to the internal structure of the aircraft in this way and the panel experiences a force tending to shift the panel, the fasteners exert a corresponding force on the panel openings to prevent the panel from shifting. However, the fasteners are generally comprised of a material that is much stronger than the material of the panel. For example, a typical fastener is comprised of stainless steel or titanium, while a typical panel is comprised of a composite material, such as fiber glass. Consequently, as the fasteners bear against the panel openings, over time the panel openings wear, i.e. become enlarged, resulting in a loose connection between the panel and the internal structure of the aircraft, or worse, the fasteners fracture or delaminate the panel, possibly resulting in the panel disengaging from the internal structure of the aircraft.

To alleviate this problem a metal insert may be affixed within the panel opening. For example, FIG. 1A shows a metal grommet 10 inserted into an aircraft panel 12 through a panel opening 14. A first end 10A of the grommet 10 abuts a first surface 12A of the panel 12, while a washer 16 having an opening 160 abuts a second surface 12B of the panel 12. The grommet 10 extends through both the panel opening 14 and the washer opening 160, such that a second end 10B of the grommet 10 protrudes from the washer opening 160. To affix the grommet 10 within the panel opening 14, the second end 10B of the grommet 10 is swaged, i.e. flared or bent, towards a recessed area 16R in the washer 16 until the second end 10B of the grommet 10 abuts an exposed surface of the washer 16 within the recessed area 16R, as shown in FIG. 1B.

FIGS. 2A–2C show prior art backup mandrels 18, 18A and 18C having shoulders of varying lengths. For clarity and to avoid duplication, a majority of the following description will involve the backup mandrel 18 having a shoulder 21B. The backup mandrel 18 comprises a nose piece 20 having the shoulder 21B and a mandrel stem 22. The mandrel stem 22 comprises a stem head, a stem body and a stem tip. The stem head is larger than a nose piece opening and the stem body and stem tip are smaller than the nose piece opening to allow the stem body and tip to be inserted into the nose piece opening. A first portion of the stem body is housed within the nose piece opening, while a second portion of the stem body and the stem tip protrude from the nose piece opening.

FIGS. 2D–2F show the prior art backup mandrel 18 being used to affix the grommet 10 within the panel opening 14. In use, the stem tip, the stem body and the shoulder 21B are inserted into the grommet 10 until the nose piece 20 abuts the first end 10A of the grommet 10 and the stem tip and the second portion of the stem body protrude from the second end 10B of the grommet 10. The second portion of the stem body and the stem tip are then inserted into an opening in a swage gun 24. The swage gun 24 comprises a first swage tool 28, which is moved in a position disposed within an inner diameter of the grommet 10. Within the swage gun 24 is a plurality of jaws 26 having teeth that removably clampingly engage a plurality of grooves 25 in the stem tip. When the jaws 26 are clampingly engaged with the stem tip, the jaws 26 pull the stem, and therefore the entire backup mandrel 18 towards the swage gun 24. This motion causes the second end 10B of the grommet 10 to contact an angled shoulder 30 on the first swage tool 28.

As shown in FIG. 2E, as the second end 10B of the grommet 10 is pressed against the angled shoulder 30 of the first swage tool 28, the second end 10B of the grommet 10 swages, i.e. is bent, in the shape of the angled shoulder 30. However, as can be seen in FIG. 2E, during the swaging, a portion 32 of the inner diameter of the grommet 10 is not supported. As a result, buckling 34 often occurs in the unsupported portion 32 of the grommet 10. As a result, as the jaws 26 continue to pull the backup mandrel 18 towards the swage gun 24, the shoulder 21 is often compressed by the buckling 34. This makes removal of the shoulder 21B from the grommet 10 after the grommet 10 has been affixed to the panel 12 difficult. In addition, the compression of the shoulder 21B can cause breakage of the mandrel stem 22; tearing or delaminating of the panel 12; or failure of the installed grommet. Also, in some instances the buckling 34 reduces the grommet internal diameter to the point that the fastener intended to be inserted into the grommet 10, to attach the panel 12 to the internal structure of the aircraft, cannot be inserted through the grommet 10 past the buckling 34. In such an instance, the grommet 10 must be drilled out of the panel 12 and, if the panel 12 did not suffer any damage, a new grommet 10 must be installed into the panel 12.

As shown in FIG. 2F, when a biasing force that biases the first swage tool 28 towards the grommet 10 is overcome by the force required to further swage the grommet 10, a further pulling of the backup mandrel 18 towards the swage gun 24 by the jaws 26 causes the first swage tool 28 to retract into the swage gun 24. When the first swage tool 28 is retracted, a second swage tool 36 is allowed to contact the second end 10B of the grommet 10. Thus, as the jaws 26 continue to pull the backup mandrel 18 towards the swage gun 24, the second swage tool 36 contacts the second end 10B of the grommet 10, swaging the second end 10B of the grommet 10 towards the recessed area 16R of the washer 16 until the second end 10B of the grommet 10 contacts the washer 16.

However, because the backup mandrel 18 does not comprise a force limiting or shock absorbing means, the swaging of the grommet 10 by the first and second swage tools 28 and 36 occurs at full force and very abruptly, i.e. the first and second swage tools 28 and 36 slam into the second end 10B of the grommet 10 at full force and with considerable shock, causing the first end 10A of the grommet 10 to forcefully press against the nose piece 20, often causing dishing 38 (see FIG. 3C) in the first end 10A of the grommet 10.

The dishing 38 often causes the fastener, which is intended to be inserted into the grommet 10 to attach the panel 12 to the internal structure of the aircraft, to not fit flushly against the first end 10A of the grommet 10. As a result, it is difficult to fasten the fastener as far into the internal structure of the aircraft as desired, resulting in a loose connection of the panel 12 to the internal structure of the aircraft. Also, dishing 38 usually causes a collapse of the internal diameter at 10A end of the grommet 10, requiring the grommet to be removed from the structure, and replaced.

The backup mandrel 18 also has other disadvantages. For example, if the shoulder 21B contacts the first swage tool 28 the shoulder 21B will cause the first swage tool 28 to retract into the swage gun 24. As such, the length of shoulder 21 is dimensioned such that it does not contact the first swage tool 28 until the first swage tool 28 has swaged the second end 10B of the grommet 10 by a desired amount. Therefore, the length of the shoulder 21B is designed such that it is as long as possible without interfering with the first swage tool 28 during swaging. Consequently, each backup mandrel 18, 18A and 18C comprises a shoulder 21 that makes the backup mandrel 18 useful for only a limited range of panel 12 thicknesses, or in some cases for only one panel thickness. For example, if a panel has a thickness less than the thickness of the panel 12 shown in FIGS. 2E–2F, then the backup mandrel 18 cannot be used because the shoulder 21B is too long, i.e. the shoulder 21B will contact the first swage tool 28, thus forcing the first swage tool 28 to retract before the second end 10B of the grommet 10 has been swaged to a desired amount, thus resulting in a loose connection between the panel 12 and the grommet 10. Therefore, as shown in FIGS. 2G and 2H, very thin panels require the backup mandrel 18A, which has no shoulder and in some cases has a recessed counterbore 21A. The absence of a shoulder on this backup mandrel 18A makes buckling 34 even more likely to occur. FIG. 3A shows the buckling 34 that typically occurs by use of the backup mandrel 18, while FIG. 3B shows the buckling 34 that typically occurs by use of the backup mandrel 18A.

SUMMARY OF THE INVENTION

The present invention addresses the above-referenced problems by providing a backup mandrel for attaching a grommet to a washer in an aircraft panel opening comprising a housing and a nose piece attached to the housing, the nose piece having an opening. A stem is attached to the housing and has a first and a second portion, such that the first portion is disposed within the housing and the second portion protrudes from housing through the nose piece opening. A sleeve is also attached to the housing and has a first and a second segment, such that the first segment is disposed within the housing and the second segment protrudes from the housing through the nose piece opening, wherein the sleeve is displaceably mounted around the stem.

In addition, the present invention addresses problems of the prior art by providing a method of attaching a grommet to a washer in an aircraft panel opening comprising providing an aircraft panel having an opening; inserting a grommet into the panel opening, such that a first end of the grommet abuts a first side of the panel and a second end of the grommet protrudes from a second side of the panel, the grommet having an inner diameter; placing a washer over the protruding portion of the grommet, such that a first side of the washer abuts the second side of the panel and the second side of the washer is exposed; providing a back up mandrel having a nose piece attached to a housing, wherein a stem and sleeve are attached to the housing and protrude from an opening in the nose piece; inserting the protruding portions of the stem and sleeve into the inner diameter of the grommet; providing a swage gun having first and second swage tools; activating the swage gun, such that the swage gun exerts an axial force on the backup mandrel stem, causing a relative movement between the grommet and the swage tools; continuously supporting the entire inner diameter of the grommet as the grommet is swaged by the first and second swage tools.

DETAILED DESCRIPTION OF THE INVENTION

Figure 1A:
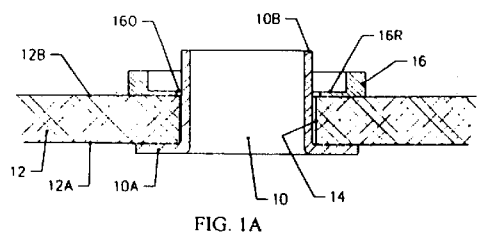
FIGS. 1A–1B show a cross-sectional view of an aircraft panel having a metal insert, such as a grommet, affixed within an opening in the panel opening.
Figure 1B:
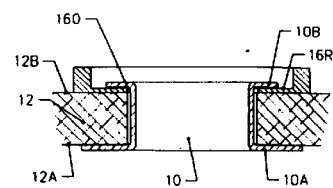
Figure 3A:
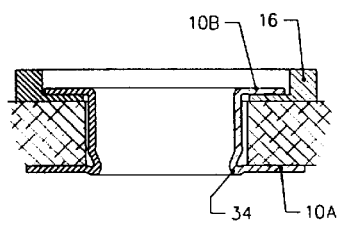
FIGS. 3A–3C show problems that can occur when using the prior art backup mandrels of FIGS. 2A–2C to affix a grommet within an aircraft panel opening.
Figure 3B:
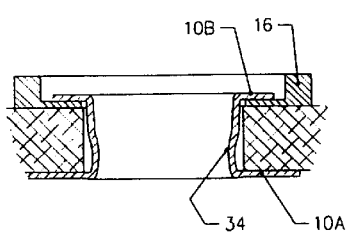
Figure 3C:
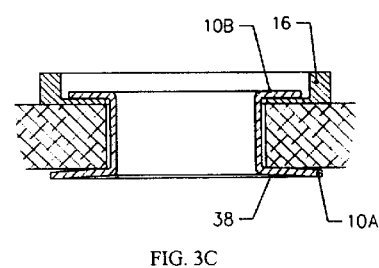
Figure 2A:
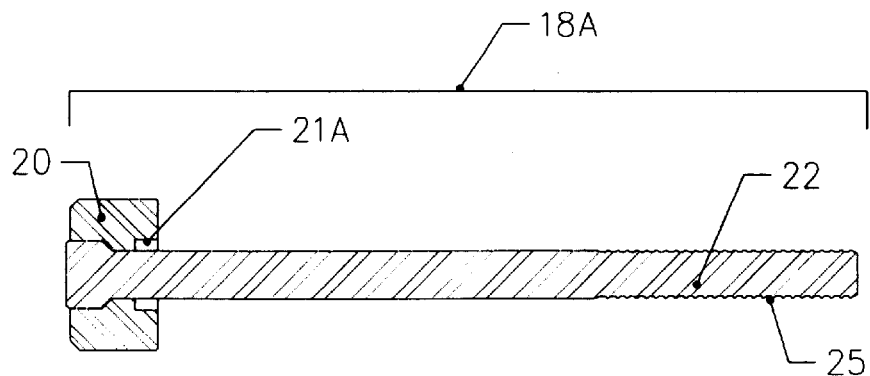
FIG. 2A shows a cross-sectional view of a prior art backup mandrel which does not have a shoulder.
Figure 2B:
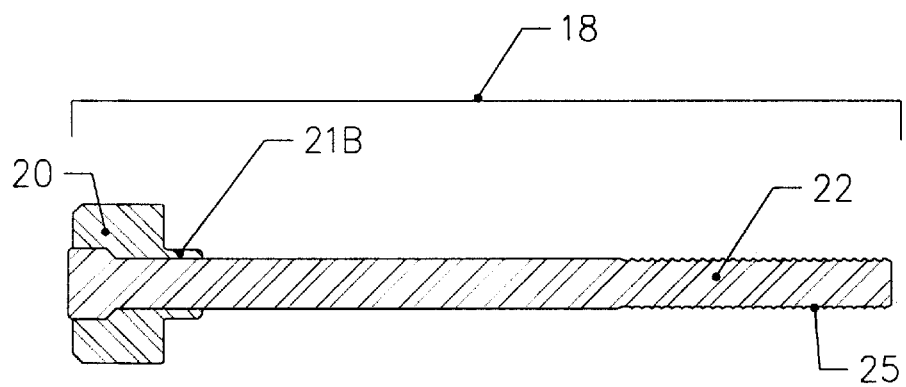
FIGS. 2B–2C show cross-sectional views of prior art backup mandrels having shoulders of different lengths.
Figure 2C:
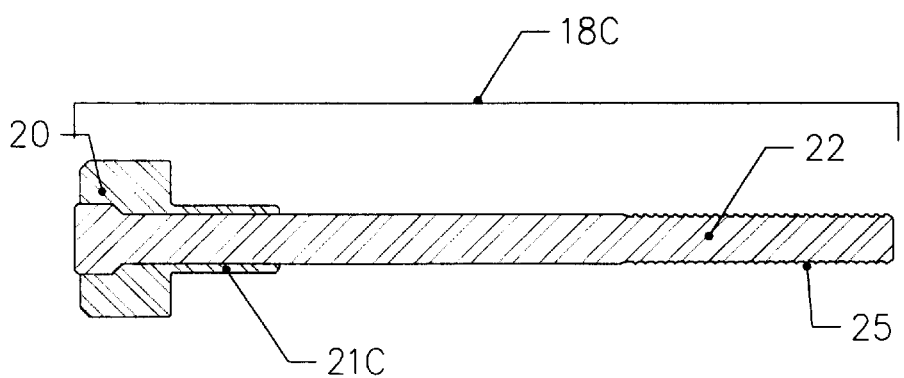
Figure 2D:
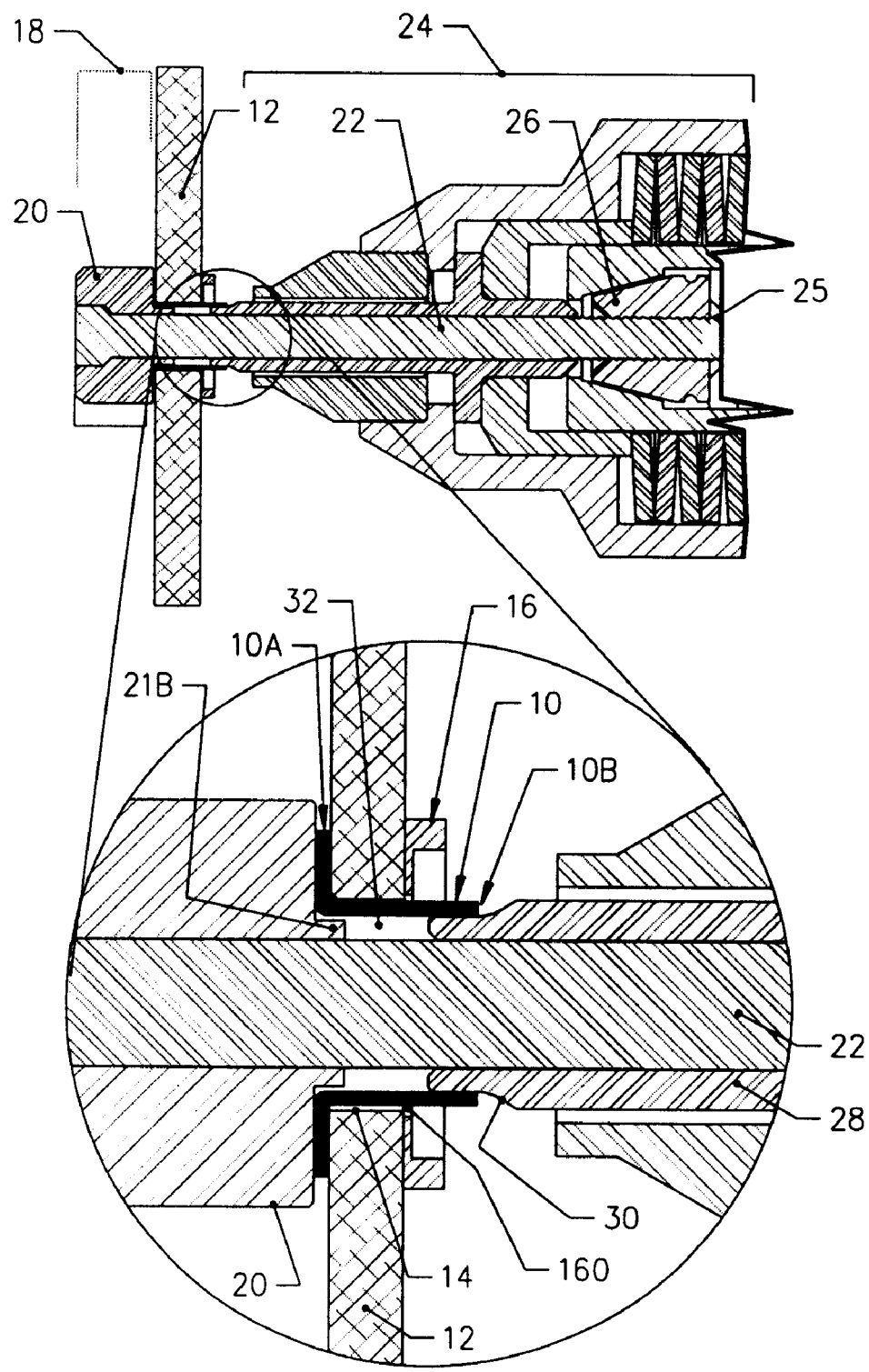
FIGS. 2D–2H show cross-sectional views of prior art backup mandrels being used to affix a grommet within an aircraft panel opening.
Figure 2E:
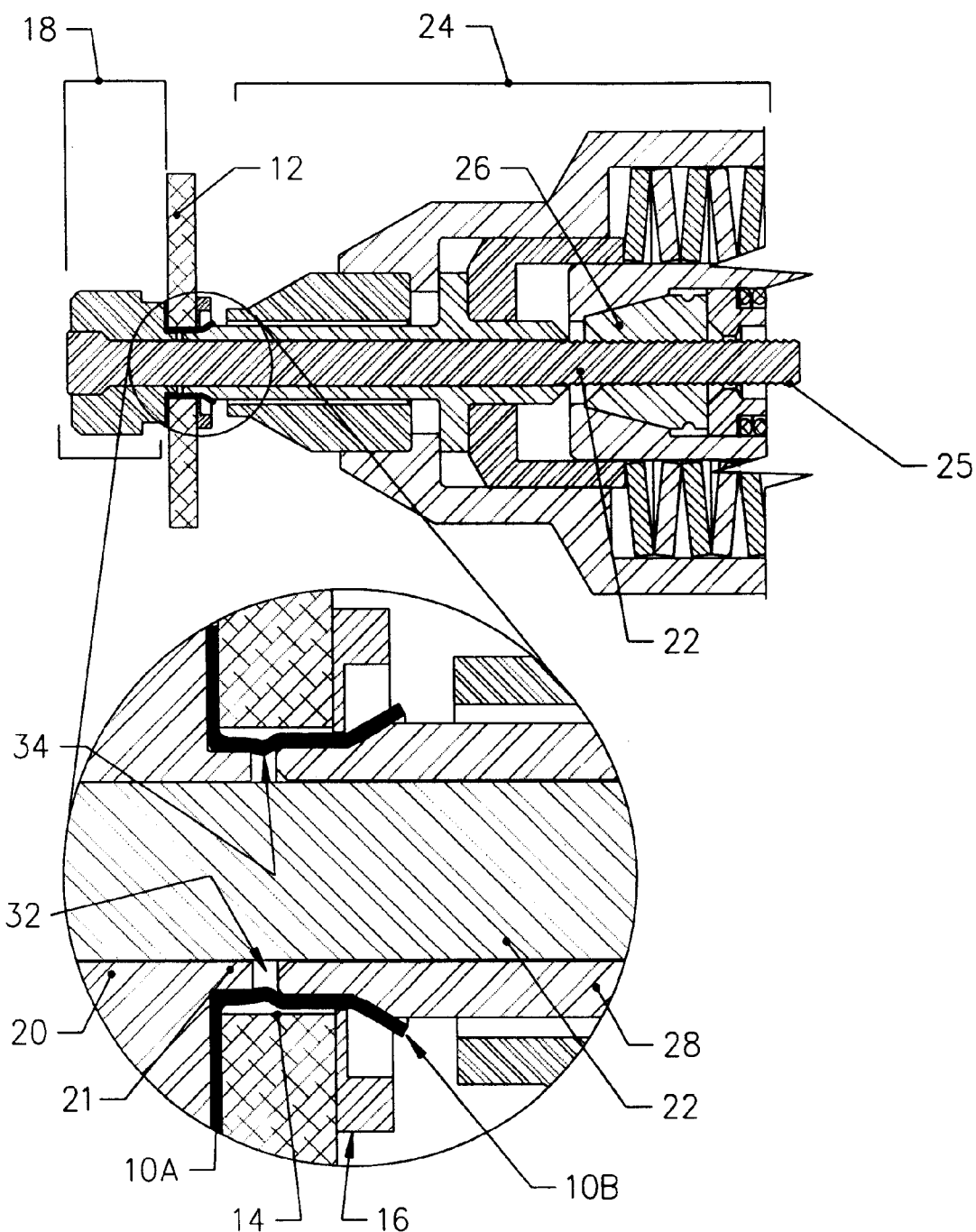
Figure 2F:
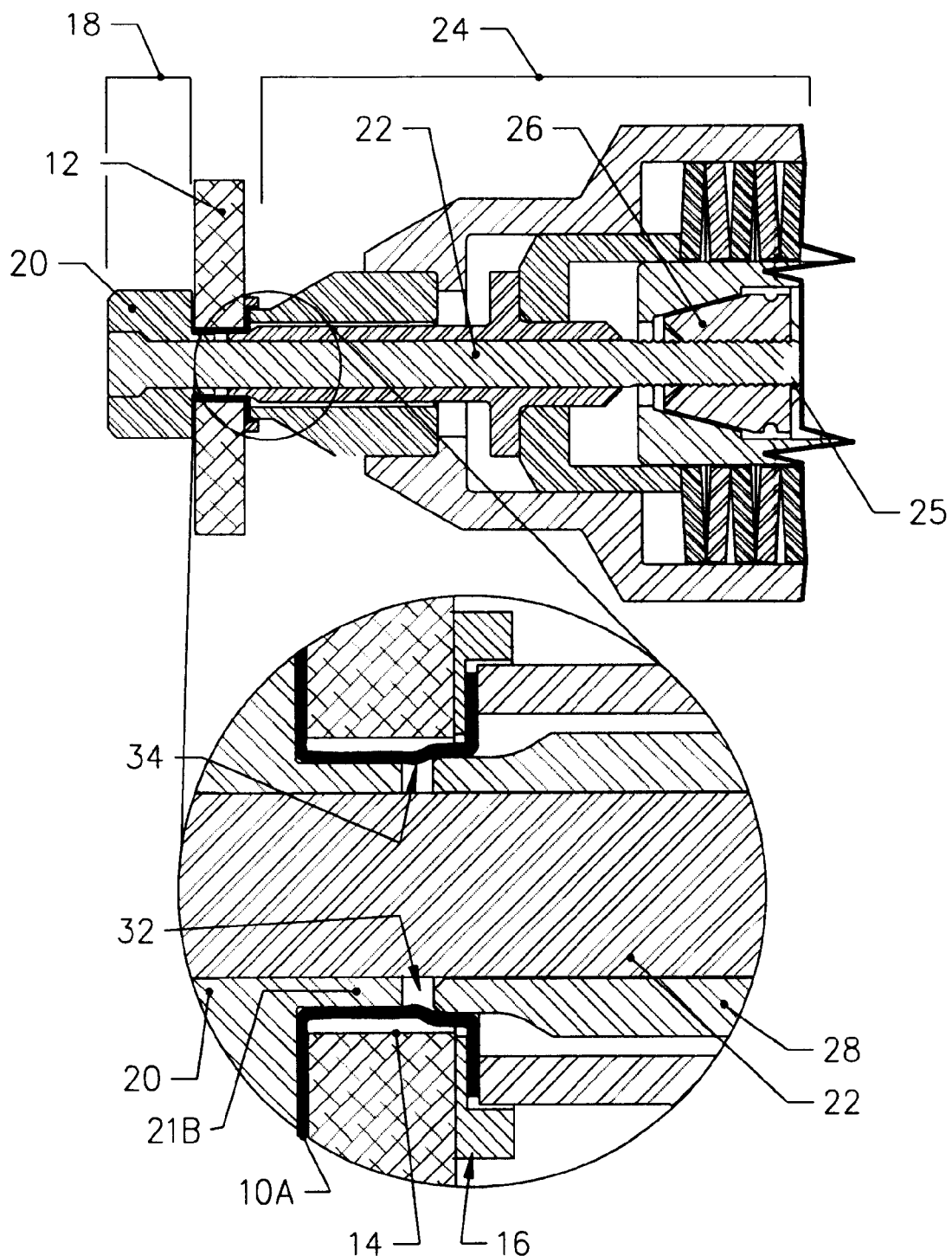
Figure 2G:
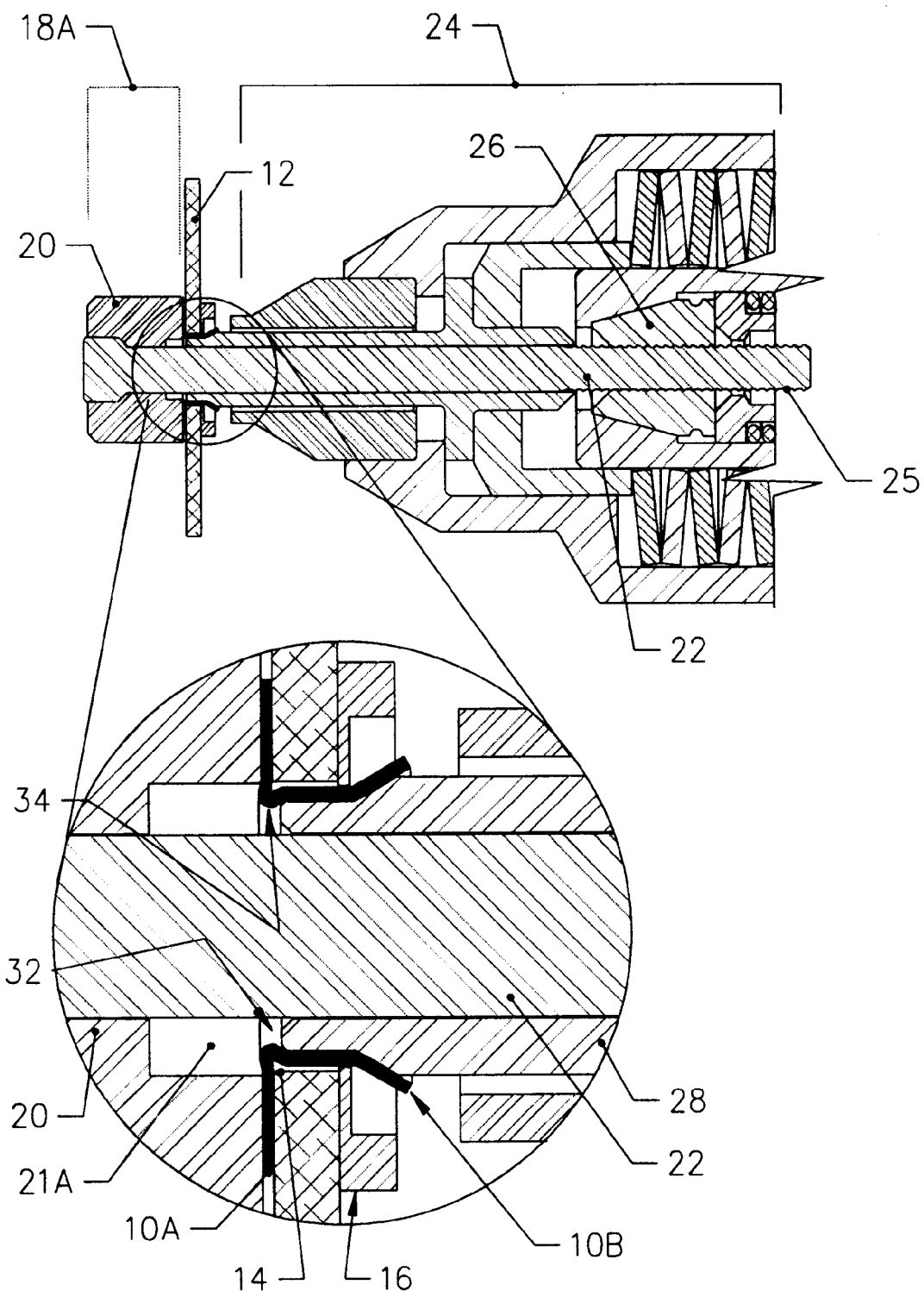
Figure 2H:
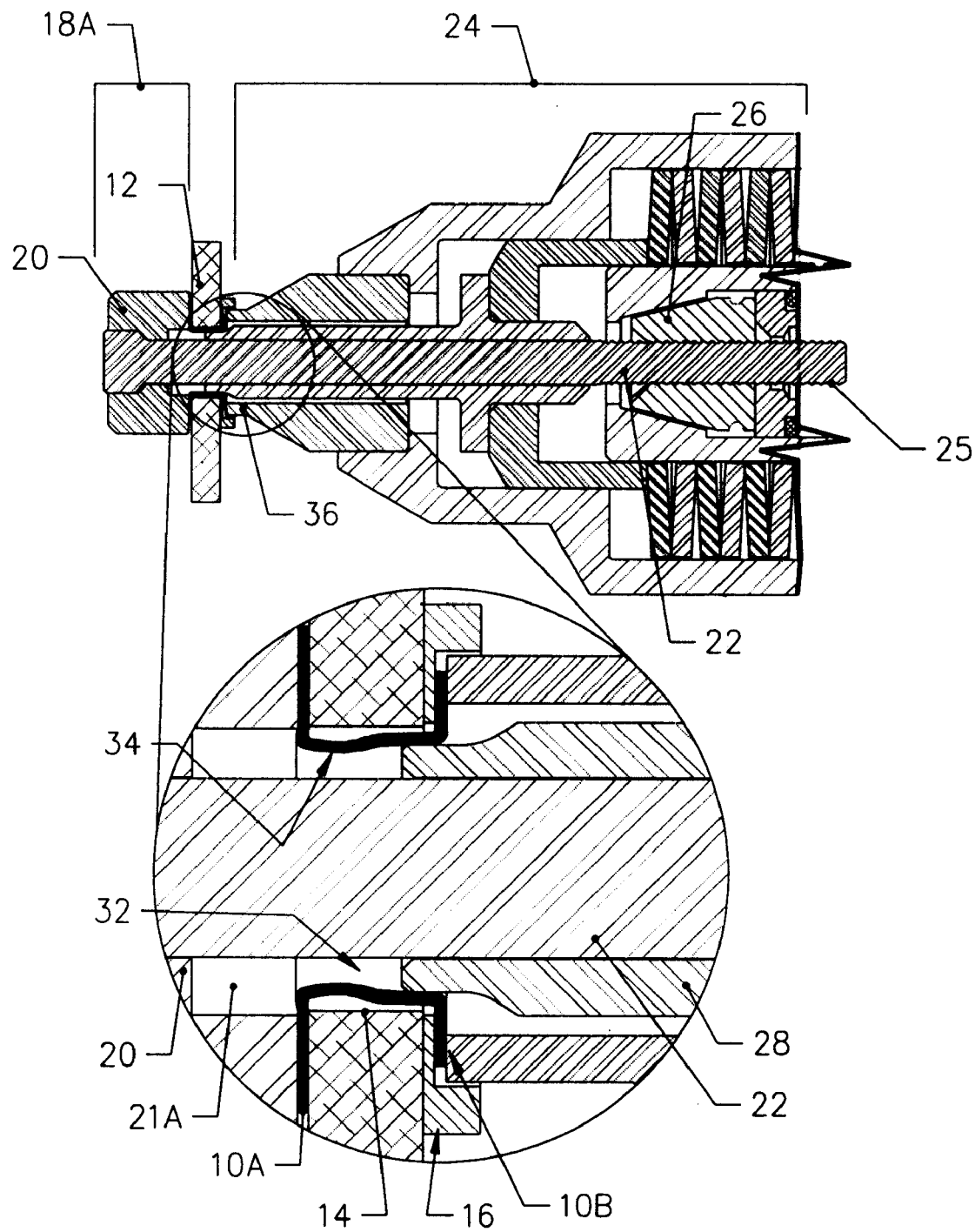
Figures 4A, 4B:
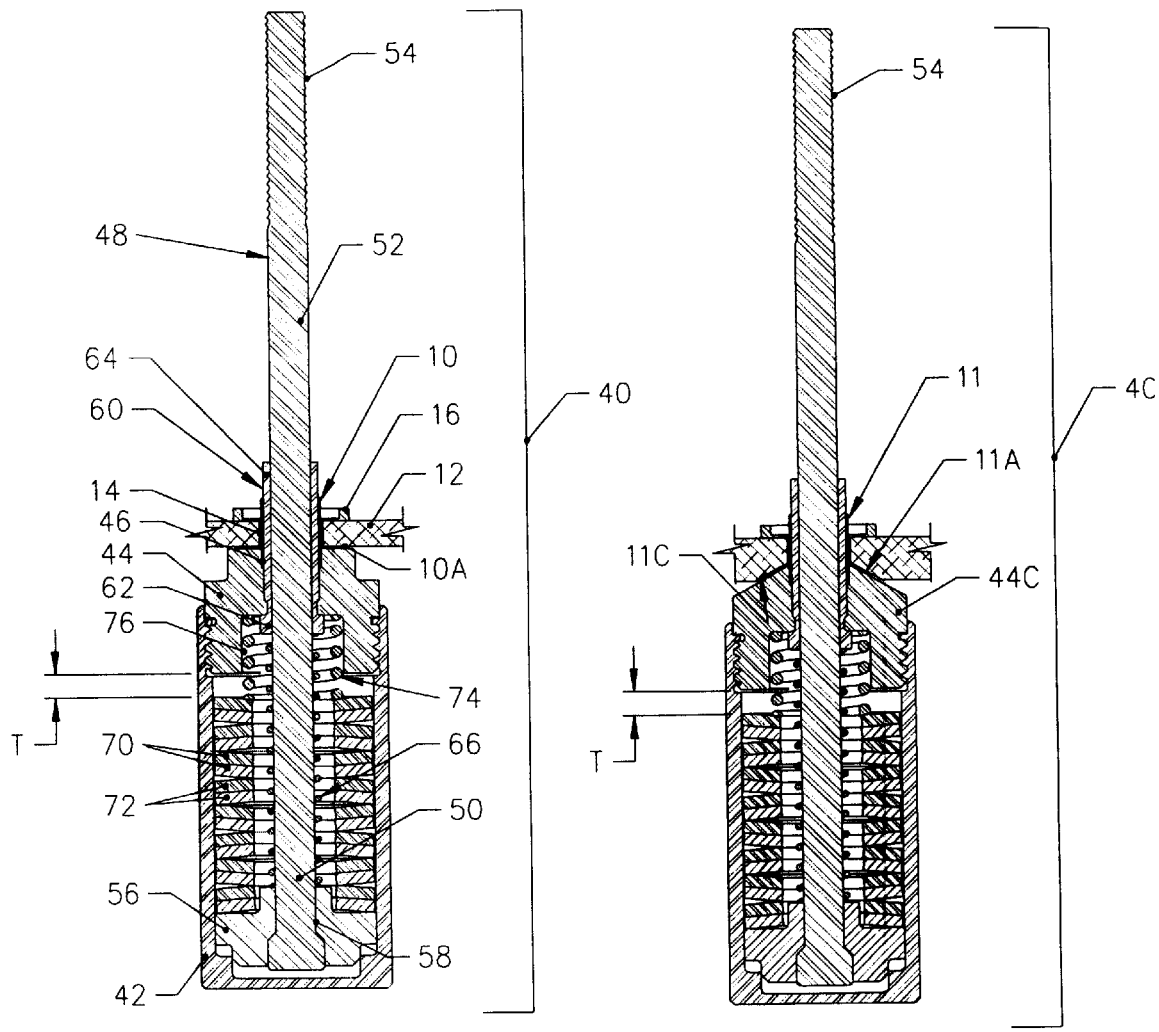
FIG. 4A shows a cross-sectional view of one embodiment of a backup mandrel of the present invention.
FIG. 4B shows a cross-sectional view of another embodiment of a backup mandrel of the present invention.

A backup mandrel 40 for attaching a metal insert, such as a grommet, to a washer within an opening in an aircraft panel is shown in FIG. 4A. The backup mandrel 40 comprises a housing 42 and a nose piece 44 attached to the housing 42. In the depicted embodiment, the housing 42 is a cylindrical metal housing having an open end, such that the nose piece 44 may be attached to the housing 42 at the open end of the housing. The nose piece 44 may be attached to the housing 42 by a variety of means, such as screw fastening, riveting, welding or by use of an adhesive, among other means. In the depicted embodiment, the open end of the housing 42 comprises internal threads and the nose piece 44 comprises external threads, such that the nose piece 44 may be removably threaded into the housing 42. The nose piece 44 also comprises an opening 46, such as a circular opening.

The backup mandrel 40 further comprises a mandrel stem 48. The stem 48 is generally cylindrical in shape and comprises a first portion 50 disposed within the housing 42 and a second portion 52 that protrudes from the nose piece opening 46. A section of the second portion 52 comprises external grooves 54, such as v-shaped or circular grooves. The first portion 50 is attached to a backup washer 56. The backup washer 56 comprises an opening 58, such as a circular opening, through which the stem 48 extends. In the depicted embodiment, the backup washer opening 58 is aligned with the nose piece opening 46 along a longitudinal axis of the housing 42 to ensure that the stem 48 moves generally along the longitudinal axis of the housing 42 when the stem 48 is axially displaced.

The backup mandrel 40 also comprises a sleeve 60 displaceably mounted around the stem 48. The sleeve 60 comprises a first segment 62 disposed within the housing 42 and a second segment 64 that protrudes from the nose piece opening 46. The sleeve 60 is generally cylindrical in shape and comprises an opening through which the stem 48 extends. The sleeve 60 also comprises an outer diameter that closely matches an inner diameter of a grommet 10 so that the outer diameter of the sleeve 60 may be used to support the inner diameter of the grommet 10. For example, the outer diameter of the sleeve 60 may be toleranced to within 0.0005 inch of the inner diameter of the grommet 10. This clearance is large enough to allow the sleeve 60 to slide within the inner diameter of the grommet 10, yet small enough to allow the sleeve 60 to support the inner diameter of the grommet 10 during a swaging of the grommet 10 to decrease the likelihood of buckling occurring in the inner diameter of the grommet 10 during the swaging. In one embodiment, the sleeve 60 is comprised of a wear resistant, high hardness material, such as D2 tool steel heat treated at 60–64 points on the Rockwell C scale. Also, the outside surface of the sleeve 60 may be polished to a very high surface finish.

In the depicted embodiment, the sleeve 60 is slidably mounted around an outer diameter of the stem 48. The sleeve 60 is also biased, for example by a compression spring 66, in an axial direction away from the housing 42. In the depicted embodiment, the compression spring 66 is mounted around the outer diameter of the stem 48 within the housing 42 and comprises first and second ends, wherein when the spring 66 is compressed, the first end contacts the backup washer 56 and the second end contacts the sleeve 60 to bias the sleeve 60 in an axial direction away from the housing 42. The compression spring 66 allows the sleeve second segment 64 to be at least partially retractable into the backup mandrel housing 42.

The backup mandrel 40 may also comprise shock absorbing means 68 for partially absorbing a force that tends to pull the stem 48 in an axial direction away from the housing 42. The shock absorbing means 68 may comprise a spring, such as a compression spring, a wave spring or a spring disc, among other springs. Other shock absorbing means 68 may be used as well, such as hydraulics. In the depicted embodiment, the shock absorbing means 68 comprises a plurality of conically shaped spring discs or compressible washers, such as Belleville washers.

Figure 5A:
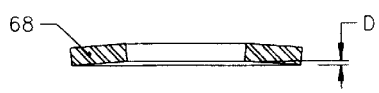
FIG. 5A shows a cross-sectional view of a conically shaped spring disc, such as a Belleville washer, in an uncompressed state.
Figure 5B:
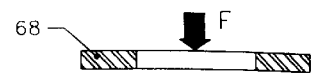
FIG. 5B shows a cross-sectional view of the spring disc of FIG. 5A in a compressed state.

A spring disc in a uncompressed state is shown in FIG. 5A. After the application of a force, F, the spring disc is deflected by a distance, D, such that the spring disc takes on a flat shape as shown in FIG. 5B.

Figure 5C:
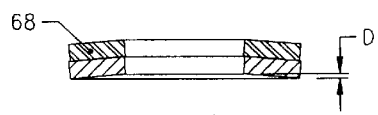
FIG. 5C shows a cross-sectional view of two spring discs stacked in parallel in an uncompressed state.
Figure 5D:
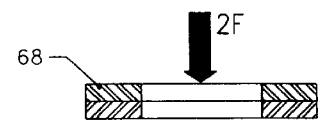
FIG. 5D shows a cross-sectional of the spring discs of FIG. 5C in a compressed state.

FIG. 5C shows two spring discs stacked in parallel. When spring discs are stacked in parallel, in order to compress the spring discs, as shown in FIG. 5D, it requires a force, 2F, that is twice the force, F, required to compress a single spring disc. However, during compression, the parallel stacked spring discs deflect by a distance, D, that is equal to the distance, D, that a single spring disc deflects during compression.

Figure 5E:
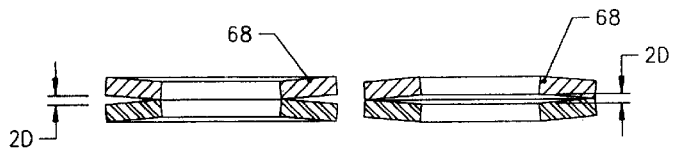
FIG. 5E shows a cross-sectional view of two arrangements of spring discs stacked in series in an uncompressed state.
Figure 5F:
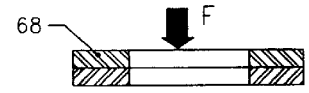
FIG. 5F shows a cross-sectional of the spring discs of FIG. 5E in a compressed state.

FIG. 5E shows two arrangements of spring discs stacked in series. When spring discs are stacked in series, in order to compress the spring discs, as shown in FIG. 5F, it requires a force, F, that is equal to the force, F, that is required to compress a single spring disc. However, during compression, the series stacked spring discs deflect by a distance, 2D, that is twice the distance, D, that a single spring disc deflects during compression.

Figure 5G:
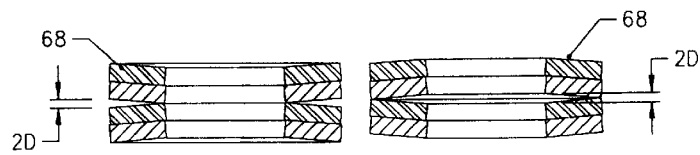
FIG. 5G shows a cross-sectional view of two arrangements of spring discs arranged in series and parallel in an uncompressed state. Specifically, two parallel spring discs are shown arranged in series with two other parallel spring discs.
Figure 5H:
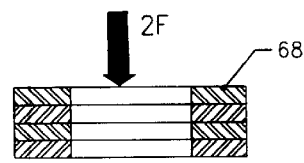
FIG. 5H shows a cross-sectional of the spring discs of FIG. 5G in a compressed state.

FIG. 5G shows two arrangements of spring discs stacked in series and parallel. Specifically, FIG. 5G shows two parallel spring discs stacked in series with two other parallel spring discs. In such arrangements, in order to compress the spring discs, as shown in FIG. 5H, it requires a force, 2F, that is twice the force, F, that is required to compress a single spring disc. During compression of such arrangements, the spring discs deflect by a distance, 2D, that is twice the distance, D, that a single spring disc deflects during compression.

The shock absorbing means 68 for the backup mandrel 40 of the current invention may comprise a plurality of spring discs stacked in either parallel, series, or series and parallel. In one embodiment, the shock absorbing means 68 comprises a first grouping 70 of at least two parallel spring discs arranged in series with a second grouping 72 of at least two parallel spring discs. In the depicted embodiment of FIG. 4A, the shock absorbing means 68 comprises multiple groupings of parallel spring discs, wherein each parallel grouping is arranged in series with an adjacent parallel grouping. This depicted arrangement has the advantage of absorbing a relatively large amount of force while also allowing for a relatively large amount of deflection.

In the depicted embodiment, the shock absorbing means 68 is slidably mounted around the outer diameter of the stem 48 and within the housing 42, such that when a force pulls the stem 48 in an axial direction away from the housing 42, the shock absorbing means 68 partially absorbs the force.

The backup mandrel 40 may also comprise means for limiting a force transmitted to a grommet. For example, a swage gun, described in further detail below, is often used in combination with a backup mandrel to affix a grommet within an aircraft panel opening. However, often the swage gun transmits a larger force than is needed to affix the grommet within the aircraft panel opening. This excessive force typically produces dishing of the grommet and/or a collapsing of the internal diameter of the grommet, either of which can cause a failure of the grommet as described above. As a result, it is advantageous to limit the force that the swage gun transmits to the grommet. This can be accomplished by limiting an active travel of a force exerting means of the swage gun, wherein the active travel is the distance that the force executing means of the swage gun travels during the swaging of the grommet.

The smaller the active travel of the swage gun, the smaller the force exerted on the grommet. In the depicted embodiment, the shock absorbing means 68 is kept in tension (away from the nose piece 44), for example, by a compression spring 74. The compression spring 74 is mounted around the outer diameter of the sleeve 60 and spring 66 and comprises a first end that may be disposed within a counterbore 76 in the nose piece 44 and a second end in contact with the shock absorbing means 68. The presence of the compression spring 76 produces a travel distance, T, through which the mandrel stem 48 is allowed to axially move without compressing the shock absorbing means 68, thus allowing the swage gun to travel the distance, T, without transmitting a force to either the shock absorbing means 68 or the grommet 10. As a result, the active travel of the swage gun is limited by the travel distance, T, and thus the force transmitted from the swage gun to the grommet is limited.

In the depicted embodiment of FIG. 4A, the first end 10A of the grommet 10 is flat. As a result, a portion of the nose piece 44 that contacts the first end 10A of the grommet 10 is correspondingly flat. However, some grommets have first ends that are not flat. For example, FIG. 4B shows a grommet 11 having a first end 11A with an angled countersink 11C. For such a grommet, it is advantageous for the backup mandrel 40 to have a nose piece 44C that has an angled surface corresponding to the angle of the countersink 11C in the first end 11A of the grommet 11.

As opposed to the prior art backup mandrel where the nose piece is not detachable, the backup mandrel 40 of the current invention may be used on different types of grommets, for example the backup mandrel 40 can be transformed from a backup mandrel 40 appropriate for use with flat grommets 10, to a backup mandrel 40 appropriate for use with countersunk grommets 11 by merely removing the flat nose piece 44 and replacing it with the angled nose piece 44C, thus obviating the need for a separate backup mandrel for each type of grommet. Although flat and countersunk grommets 10 and 11 have been described, grommets having other configurations may be used with the backup mandrel 40 of the current invention.

Figure 6A:
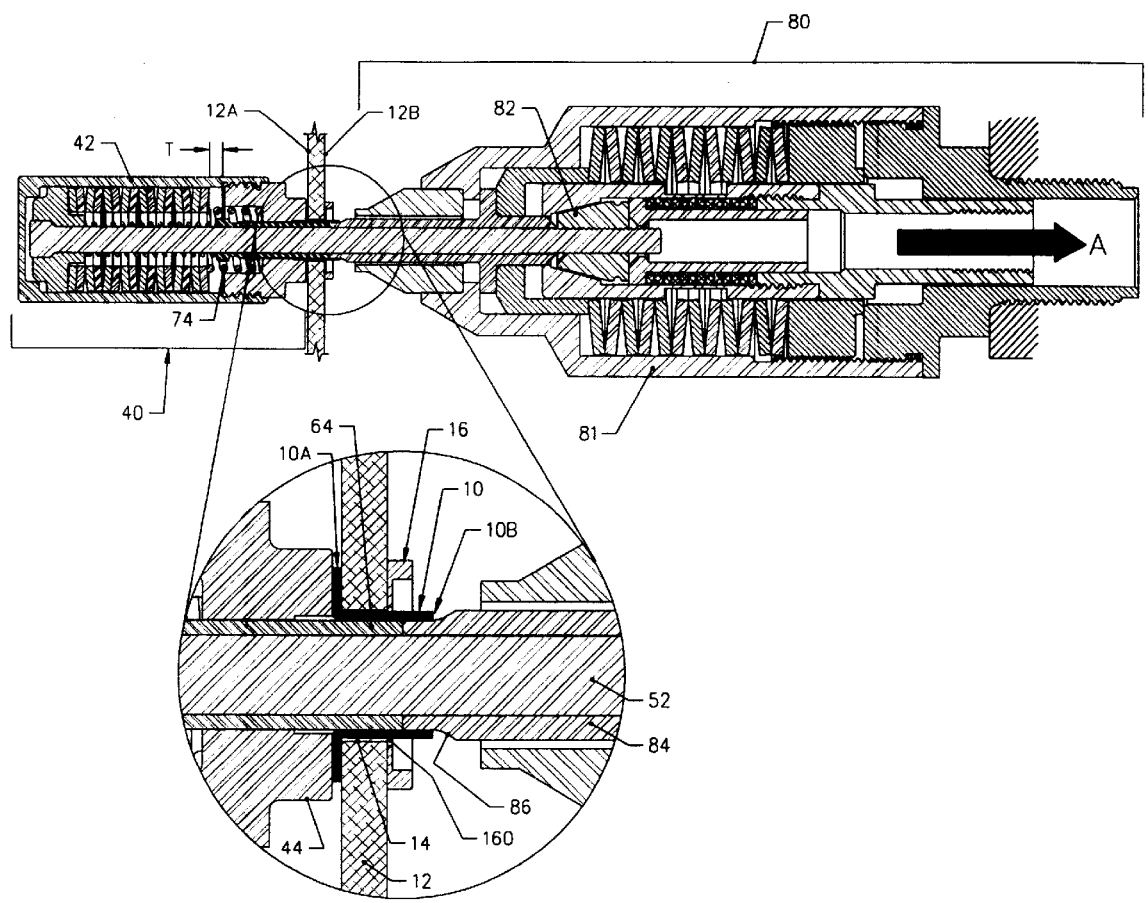
FIGS. 6A–6C show a cross-sectional view of the backup mandrel of the present invention being used to affix a grommet within an aircraft panel opening.
Figure 6B:
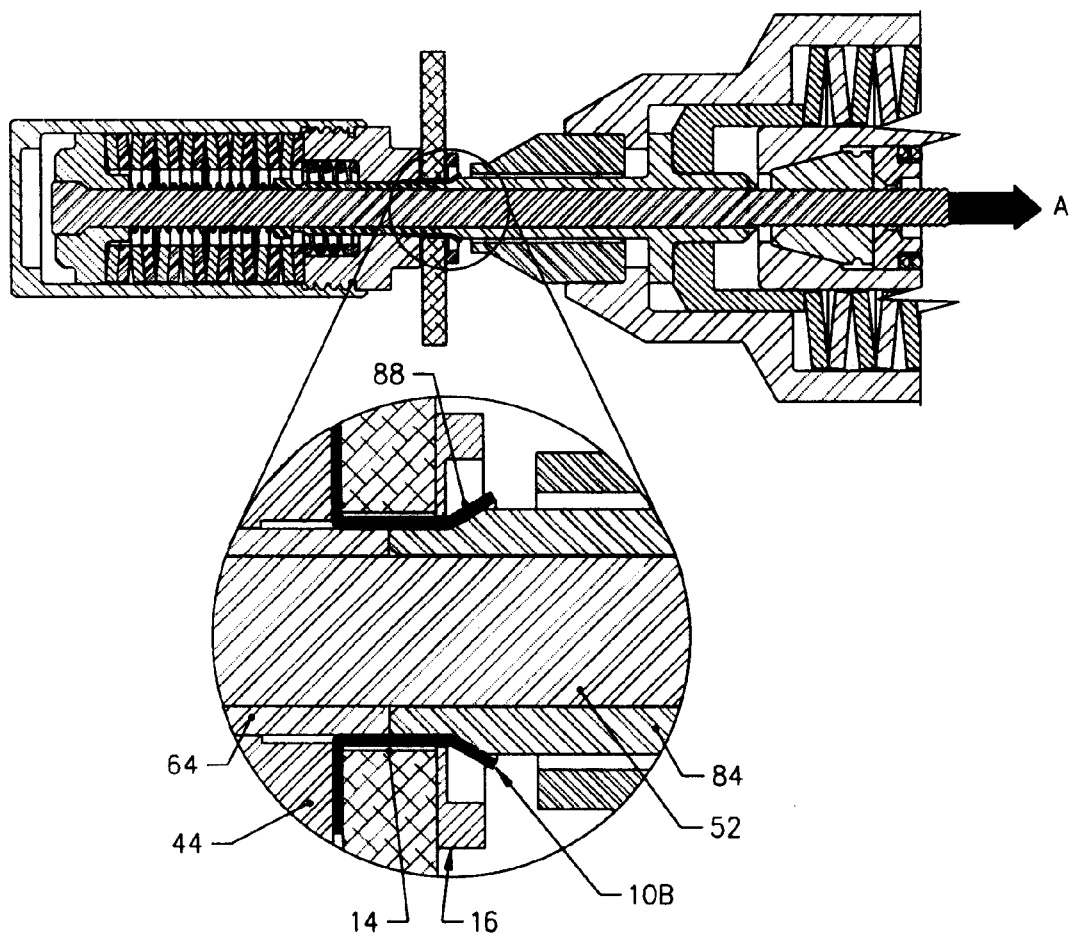
Figure 6C:
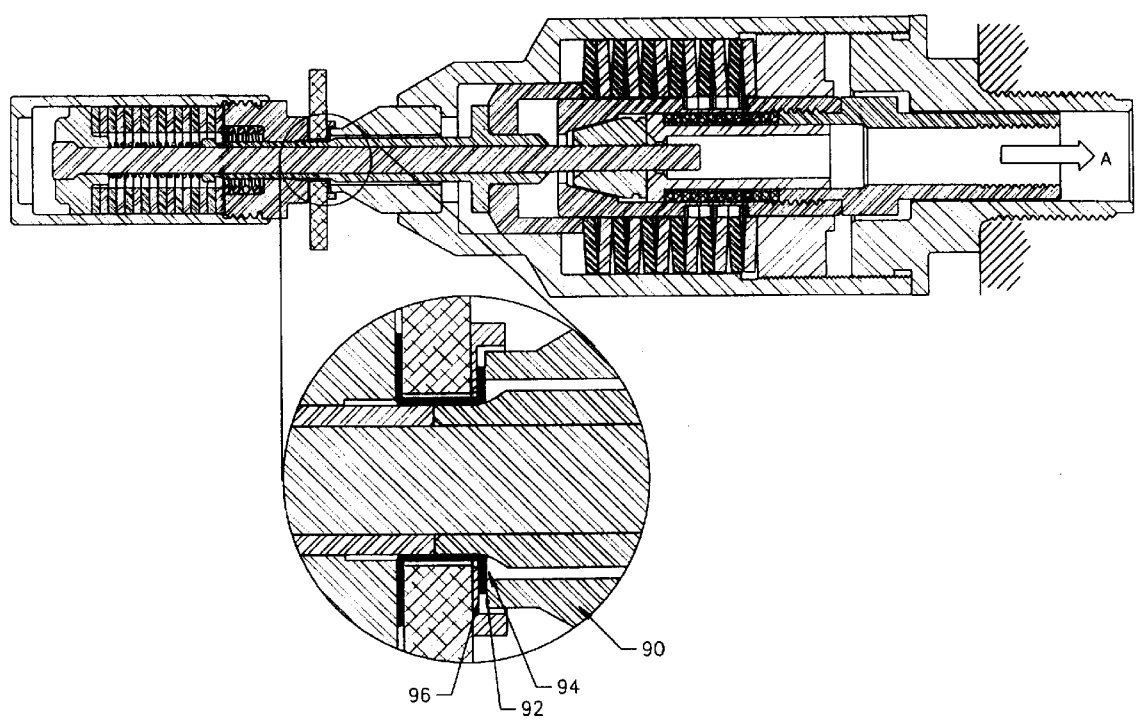

FIGS. 6A–6C show the backup mandrel 40 of the current invention used in combination with a swage gun 80 to attach a grommet to a washer in an aircraft panel opening. For clarity, FIGS. 6A–6C show the grommet 10 with the flat first end 10A and the backup mandrel nose piece 44 with the correspondingly flat surface in contact with the flat first end 10A of the grommet 10. However, the following description applies equally well to situations where the first end 11A of the grommet 11 has the angled countersink 11C and the nose piece 44C has the correspondingly angled surface in contact with the countersink 11C or to other combinations of grommet configurations and nose piece configurations.

As shown in FIG. 6A, the grommet 10 is inserted into the aircraft panel opening 14 until the second end 10B of the grommet 10 protrudes from the second surface 12B of the panel 12 and the first end 10A of the grommet 10 abuts the first surface 12A of the panel 12. The washer 16 is placed around the grommet 10 until the second end 10B of the grommet 10 protrudes from the washer opening 160 and the washer 16 abuts the second surface 12B of the panel 12. The stem second portion 52 and the sleeve second segment 64 are inserted into an inner diameter of the grommet 10 and the stem second portion 52 is further inserted into an opening in the swage gun 80.

The swage gun 80 also comprises a swage gun housing 81. In the depicted embodiment, a first swage tool 84 protrudes from the swage gun housing 81 and is disposed in surrounding relation to the stem second portion 52 when the stem second portion 52 is disposed within the swage gun housing 81. In use, the swage gun 80 is advanced towards the backup mandrel 40 until the first swage tool 84 contacts the sleeve second segment 64, causing the sleeve 60 to partially retract into the backup mandrel housing 42. Preferably, the swage gun 80 continues advancing towards the backup mandrel 40 until the first swage tool 84 is inserted into the inner diameter of the grommet 10 and the second end 10B of the grommet 10 abuts an angled shoulder 86 of the first swage tool 84, this action causes a further retraction of the sleeve 60 into the backup mandrel housing 42.

As previously discussed, the outer diameter of the sleeve 60 is closely tolerance to the inner diameter of the grommet 10, thus producing a clearance large enough to allow the sleeve 60 to slide within the inner diameter of the grommet 10, yet small enough to allow the sleeve 60 to support the inner diameter of the grommet 10. An outer diameter of the first swage tool 84 is similarly toleranced. An advantage of the backup mandrel 40 of the current invention is that, due to the retractability of the sleeve 60, when the grommet 10 is being swaged, the first swage tool 84 and the sleeve second segment 64 maintain contact, such that the combination of the outer diameters of the first swage tool 84 and the sleeve second segment 64 supports the entire inner diameter of the grommet 10 during the swaging of the grommet 10, thus practically eliminating the likelihood of buckling in the grommet 10 or collapsing of the internal diameter of the grommet 10. In addition, the retractability of the sleeve 60 allows a single backup mandrel 40 of the current invention to be used on panels 12 of varying thicknesses. Backup mandrels of the prior art are often useful for only one panel thickness, such that each different panel thickness requires a different backup mandrel.

A plurality of jaws 82 are disposed within the swage gun housing 81. In the depicted embodiment, the swage gun 80 comprises three jaws. The jaws 82 have grooves or teeth that releasably clampingly engage the external grooves 54 on the stem second portion 52. To swage the second end 10B of the grommet 10, the swage gun 80 is activated, such that the jaws 82 clampingly engage the external grooves 54 on the stem second portion 52 and exert an axial force, A, on the stem 48 tending to pull the stem 48 further within the swage gun housing 81. The axial force, A, is continually applied to the stem 48 until the swaging of the grommet 10 has been completed. As will be discussed in further detail below, the swaging of the grommet 10 includes pressing the second end 10B of the grommet 10 against the first swage tool 84 and then against a second swage tool 90.

As the jaws 82 exert the axial force, A, on the stem 48, the stem first portion 50 and the backup washer 56 are axially displaced towards the swage gun 80. This causes the shock absorbing means 68 to be axially displaced towards the swage gun 80, which in turn causes the compression spring 74 to be compressed. When the compression spring 74 is compressed to the extent that the entire compression spring 74 is disposed within the counterbore 76 of the nose piece 44, the shock absorbing means 68 contacts the nose piece, causing a relative movement between the swage gun 80 and the backup mandrel 40 and thus a relative movement between the grommet 10 and the first swage tool 84.

The relative movement between the grommet 10 and the first swage tool 84 causes the second end 10B of the grommet 10 to contact the angled shoulder 86 of the first swage tool 84. The angled shoulder 86 exerts a swage force on the grommet 10 causing the second end 10B of the grommet 10 to swage outwardly, forming a flared portion 88 on the second end 10B of the grommet 10, as is shown in FIG. 6B. As can be seen in FIGS. 6A and 6B, the entire inner diameter of the grommet 10 is continuously supported by the outer diameters of the first swage tool 84 and the sleeve 60 during the swaging of the second end 10B of the grommet 10 by the first swage tool 84. As a result, buckling of the inner diameter of the grommet 10 is unlikely to occur during the swaging of the grommet 10 by the first swage tool 84.

As the first swage tool 84 is swaging the second end 10B of the grommet 10, a biasing means, such as a spring, applies a force on the first swage tool 84 to bias the first swage tool 84 towards the grommet 10. However, after a certain amount of swaging, the force required to continue swaging the second end 10B of the grommet 10 becomes greater than the biasing force exerted on the first swage tool 84 by the springs. When this occurs, the grommet 10 exerts an axial force on the first swage tool 84 causing at least the angled shoulder 86 of the first swage tool 84 to be retracted into the swage gun housing 81, as is shown in FIG. 6C.

The retracting of the first swage tool 84 into the swage gun housing 81 allows the flared portion 88 on the second end 10B of the grommet 10 to contact the second swage tool 90. The second swage tool 90 has a flat surface 92 that contacts the flared portion 88 on the second end 10B of the grommet 10. The flat surface 92 exerts a swage force on the flared portion 88 to swage the flared portion 88 towards the recessed area 16R of the washer 16, forming a substantially flat portion 94 of the second end 10B of the grommet 10 that is generally perpendicular to the inner diameter of the grommet 10 as shown in FIG. 6C. Preferably, the second swage tool 90 continues to exert a swage force on the flat portion 94 of the second end 10B of the grommet 10 until the flat portion 94 is compressed against an exposed face of the washer 96, thus affixing the grommet 10 to the washer 16 within the panel opening 14. As can be seen from FIG. 6C, during the swaging of the grommet 10 by the second swage tool 90 the entire inner diameter of the grommet 10 is supported either solely by the outer diameter of the sleeve 60 or by the outer diameters of the sleeve 60 and the first swage tool 84. As a result, buckling of the inner diameter of the grommet 10 is unlikely to occur during the swaging of grommet 10 by the second swage tool 90.

As previously discussed, an advantage of the backup mandrel 40 of the current invention is that the force limiting means, such as the spring 74, limits the force that the swage gun 80 transmits to the grommet 10 so that an excessive force is not transmitted to the grommet 10. This is accomplished, for example, by use of the spring 74, which limits the active travel of the force exerting means of the swage gun 80 by the travel distance, T.

In addition, the shock absorbing means 68 transmits the force, A, from the swage gun 80, (that the jaws 82 of the swage gun 80 exert on the stem 48 of the backup mandrel 40) at a slower rate, avoiding the impact shock that occurs by use of backup mandrels of the prior art. As a result, the swage forces exerted by the first and second wage tools 84 and 90 on the grommet 10 are applied at a much slower rate than that which occurs by use of the backup mandrels of the prior art, i.e. in the magnitude of seconds as opposed to in the magnitude of tenths of a second. Thus, a dishing of the grommet 10 and a collapsing of the internal diameter of the grommet 10 are much less likely to occur when using the backup mandrel 40 of the current invention as compared to prior backup mandrels.

In addition, the force limiting means and the shock absorbing means 68 may be adjusted. For example, if it is observed that use of the backup mandrel 40 of the current invention to attach the grommet 10 to the washer 16 is resulting in incomplete swaging or loose attachments of the grommet 10 to the panel 12, then the travel distance, T, may be shortened. If this is observed and the shock absorbing means 68 comprises a plurality of spring discs, then adding one or more spring discs will reduce the travel distance, T, and thus increase the active travel of the swage gun 80, which allows the swage gun 80 to transmit a larger force to the grommet 10. If one or more spring discs have been added as described above and the incomplete swaging and/or the loose grommet attachment problem still exists, the shock absorbing means 68 may not be stiff enough and thus may be dissipating too much of the force. By re-arranging the spring discs inside of housing 42 to have a larger number of discs in parallel, the shock absorbing means 68 will become stiffer, thus transmitting more force at a faster rate (with more shock) to the grommet 10.

If all the spring discs of the shock absorbing means 68 are stacked in parallel, as shown in FIG. 5C, then collapsing all of the discs requires a force equal to the force, F, that it takes to collapse one disc multiplied by the number of discs used. The resulting shock absorbing means 68 would be relatively rigid, and a high impact shock would be transmitted from the swage gun 80 to the grommet 10.

At an extreme, if the travel distance, T, equals zero, and all the spring discs are stacked in parallel, then a highest swage force and shock impact will be transmitted from the swage gun 80 to the grommet 10.

On the other hand, if it is observed that use of the backup mandrel 40 of the current invention to attach the grommet 10 to the washer 16 is resulting in dishing in the first end 10A of the grommet 10, or if other failure modes indicating excessive swage force are observed, then the swage gun 80 may be transmitting too much force to the grommet 10. If this is observed and the shock absorbing means 68 comprises a plurality of spring discs, then removing one or more spring discs will increase the travel distance, T, and thus decrease the active travel of the swage gun 80, which decreases the amount of force that the swage gun 80 transmits to grommet 10. If one or more spring discs have been removed and the excessive force problem still exists, the shock absorbing means 68 may be too stiff and may not be dissipating enough of the force and impact shock transmitted from the swage gun 80 to the grommet 10. By re-arranging the spring discs 68 inside of housing 42 to have a larger number of discs in series, as shown in FIG. 5E, the shock absorbing means 68 will become less stiff, and thus transmit less force at a slower rate to the grommet 10 (with less shock). At an extreme condition, when all the spring discs of the shock absorbing means 68 are stacked in series as shown in FIG. 5E, then collapsing all of the discs requires a force, F, that is equal to the force required to collapse only a single disc. In this case, the distance that the stem 48 travels before completely collapsing all of the discs in the shock absorbing means 68 will be equal to the distance, D, of the collapsing of a single disc, times the number of spring discs in the shock absorbing means 68. In this case, the shock absorbing means 68 is the least rigid, absorbing the most shock and dissipating the most amount of force, A, transmitted from the swage gun 80 to the grommet 10.

During calibration of the backup mandrel 40, however, the travel distance, T, and the arrangement of discs, i.e., in parallel, series or series and parallel, can be adjusted until a desired amount of force is transmitted from the swage gun 80 to the grommet 10, such that grommet 10 failures do not occur, i.e., dishing, buckling, etc. A correct arrangement of the disc springs is achieved when the installation of the grommet is done without failures.

In a preferred embodiment, the arrangement of the disc springs includes a plurality of spring discs stacked in parallel and series, as shown in FIG. 5G.

Although the present invention has been described and illustrated with respect to a preferred embodiments thereof, it is to be understood that the invention is not to be limited since changes and modifications are within the intended scope of the invention as hereinafter claimed.

What is claimed is:

1. A backup mandrel for attaching a grommet to a washer in an aircraft panel opening comprising:

a housing;

a nose piece attached to the housing, the nose piece having an opening;

a stem attached to the housing, having a first and a second portion, such that the first portion is disposed within the housing and the second portion protrudes from housing through the nose piece opening; and a sleeve attached to the housing, having a first and a second segment, such that the first segment is disposed within the housing and the second segment protrudes from the housing through the nose piece opening, wherein the sleeve is displaceably mounted around the stem.

2. The backup mandrel of claim 1, wherein the sleeve is biased in an axial direction away from the housing.

3. The backup mandrel of claim 2, wherein a compression spring biases the sleeve in an axial direction away from the housing.

4. The backup mandrel of claim 2, wherein the sleeve second segment is at least partially retractable into the housing through the nose piece opening.

5. The backup mandrel of claim 1, wherein the nose piece is removably attached to the housing.

6. The backup mandrel of claim 1, further comprising shock absorbing means for partially absorbing a force that tends to pull the stem second portion in an axial direction away from the housing.

7. The backup mandrel of claim 6, wherein the shock absorbing means comprises a plurality spring discs.

8. The backup mandrel of claim 7, wherein the spring discs are conically shaped.

9. The backup mandrel of claim 8, wherein the conically shaped spring discs are arranged in series and parallel.

10. The backup mandrel of claim 9, wherein the plurality of spring discs comprise a first grouping of at least one parallel spring disc arranged in series with at least one parallel spring disc.

11. The backup mandrel of claim 6, further comprising a backup washer attached to the first portion of the stem, the backup washer contacting the shock absorbing means when a force pulls the stem second portion in an axial direction away from the housing.

12. The backup mandrel of claim 6, wherein the shock absorbing means is biased away from the nose piece.

13. The backup mandrel of claim 12, wherein a compression spring biases the shock absorbing means away from the nose piece, and wherein a portion of the compression spring is disposed within a counterbore in the nose piece.

14. A backup mandrel for attaching a grommet to a washer in an aircraft panel opening comprising:

a housing;

a nose piece attached to the housing, the nose piece having an opening;

a stem attached to the housing, having a first and a second portion, such that the first portion is disposed within the housing and the second portion protrudes from the housing through the nose piece opening;

a sleeve attached to the housing, having a first and a second segment such that the first segment is disposed within the housing and the second segment protrudes from the housing through the nose piece opening, wherein the sleeve is displaceably mounted around the stem and the sleeve second segment is at least partially retractable into the nose piece opening; and shock absorbing means for partially absorbing a force that tends to pull the stem second portion in an axial direction away from the housing.

15. The backup mandrel of claim 14, wherein the sleeve is biased in an axial direction away from the housing.

16. The backup mandrel of claim 15, wherein a compression spring biases the sleeve in an axial direction away from the housing.

17. The backup mandrel of claim 14, wherein the nose piece is removably attached to the housing.

18. The backup mandrel of claim 14, wherein the shock absorbing means comprises a plurality of spring discs.

19. The backup mandrel of claim 18, wherein the spring discs are conically shaped.

20. The backup mandrel of claim 19, wherein the spring discs are arranged in series and parallel.

21. The backup mandrel of claim 20, wherein the plurality of spring discs comprise a first grouping of at least one parallel spring disc arranged in series with at least one parallel spring disc.

22. The backup mandrel of claim 14, further comprising a backup washer attached to the first portion of the stem, the backup washer contacting the shock absorbing means when a force pulls the stem second portion in an axial direction away from the housing.

23. The backup mandrel of claim 14, wherein the shock absorbing means is biased away from the nose piece.

24. The backup mandrel of claim 23, wherein a compression spring biases the shock absorbing means away from the nose piece, and wherein a portion of the compression spring is disposed within a counterbore in the nose piece.

* * * * *